United States Patent [19]

Shikaumi

[11] Patent Number: 4,695,149
[45] Date of Patent: Sep. 22, 1987

[54] LIGHT MEASURING DEVICE

[75] Inventor: Masao Shikaumi, Kanagawa, Japan

[73] Assignee: Canon Kabushiki Kaisha, Japan

[21] Appl. No.: 857,237

[22] Filed: Apr. 29, 1986

[30] Foreign Application Priority Data

May 9, 1985 [JP] Japan .................................. 60-098252

[51] Int. Cl.[4] ............................................... G03B 7/08
[52] U.S. Cl. ..................................................... 354/430
[58] Field of Search ................................. 354/410, 430

[56] References Cited

U.S. PATENT DOCUMENTS 3,399,307 8/1968 Levin .............................. 354/430 X
3,580,149 5/1971 Fujis ................................ 354/430 X Primary Examiner—W. B. Perkey
Attorney, Agent, or Firm—Toren, McGeady & Associates

[57] ABSTRACT

A light measuring device for a camera, having a pyroelectric sensor for heat ray detection having substantially the same optical axis as that of a light measuring element for spot light measurement, whereby when the sensor detects an object to be photographed, a latch circuit latches the output of said light measuring element. The exposure value is thus controlled in response to the output of the latch circuit.

10 Claims, 6 Drawing Figures

LIGHT MEASURING DEVICE

BACKGROUND OF THE INVENTION

1. Field of the Invention

This invention relates to light measuring devices in which the light measurement is automatically performed on a heat source in the image frame of camera by using an infrared ray sensor.

2. Description of the Prior Art

In the situation where an object most desirable to photograph (for example, a person) lies at the marginal portion of the image frame, with general cameras, there is a possibility for that object to be improperly exposed, for example, under-exposed. The reason for this is that the light measuring function of the general camera employs the average light measuring method.

To eliminate such a problem, another method for measuring light from only a particular portion of the photographic picture frame, for example, the above-mentioned person, or so-called spot light measuring method, has been proposed, and, at the present time, is employed in various cameras.

However, in order for an object, situated such that an under-exposure will result as has been described above to be photographed at a proper exposure by this spot light measuring method, the photographer must first preliminarily position that object at the center of the image frame for performing the light measurement, and then after the result of this light measurement has been memorized, determine a composition so that the object intended to be photographed is brought back to the desired position of the image frame, for example, in the marginal portion. For this reason, there has been a drawback that the management to snap shots became bad because the above-described preliminary operation was necessary from the light measurement on the object until the exposure.

Also, there is a known method that the individual portions of the photographic image frame are made selectively possible for light measurement and, even in the above-described situation, the light from the object positioned in the marginal portion of the image frame can be measured while fixing the photographic image frame. Even in this method, the photographer must choose the appropriate light measuring output of the light measuring circuit which is measuring the light of the photographic object portion. So there remains a possibility of not choosing the output accurately.

SUMMARY OF THE INVENTION

An object of the invention is to provide a light measuring device which eliminates the problems of the above-described prior known devices.

Another object of the invention is to provide a compact light measuring device.

Still another object of the invention is to provide a light measuring device which is nearly unsusceptible to the influence of noise.

Other objects of the invention will become apparent from the following detailed description of the invention.

According to an embodiment of the invention, upon consideration of a human being or like object as a heat source, a light measuring device is provided wherein a heat source sensor, such as pyroelectric sensor, and a light measuring element are made to detect light from the substantially same optical axis, and the image frame is scanned by the light measuring element and the heat source sensor so that when the object is sensed by the heat source sensor, the light measuring output is obtained.

DETAILED DESCRIPTION OF THE PREFERRED EMBODIMENT

Figure 1:
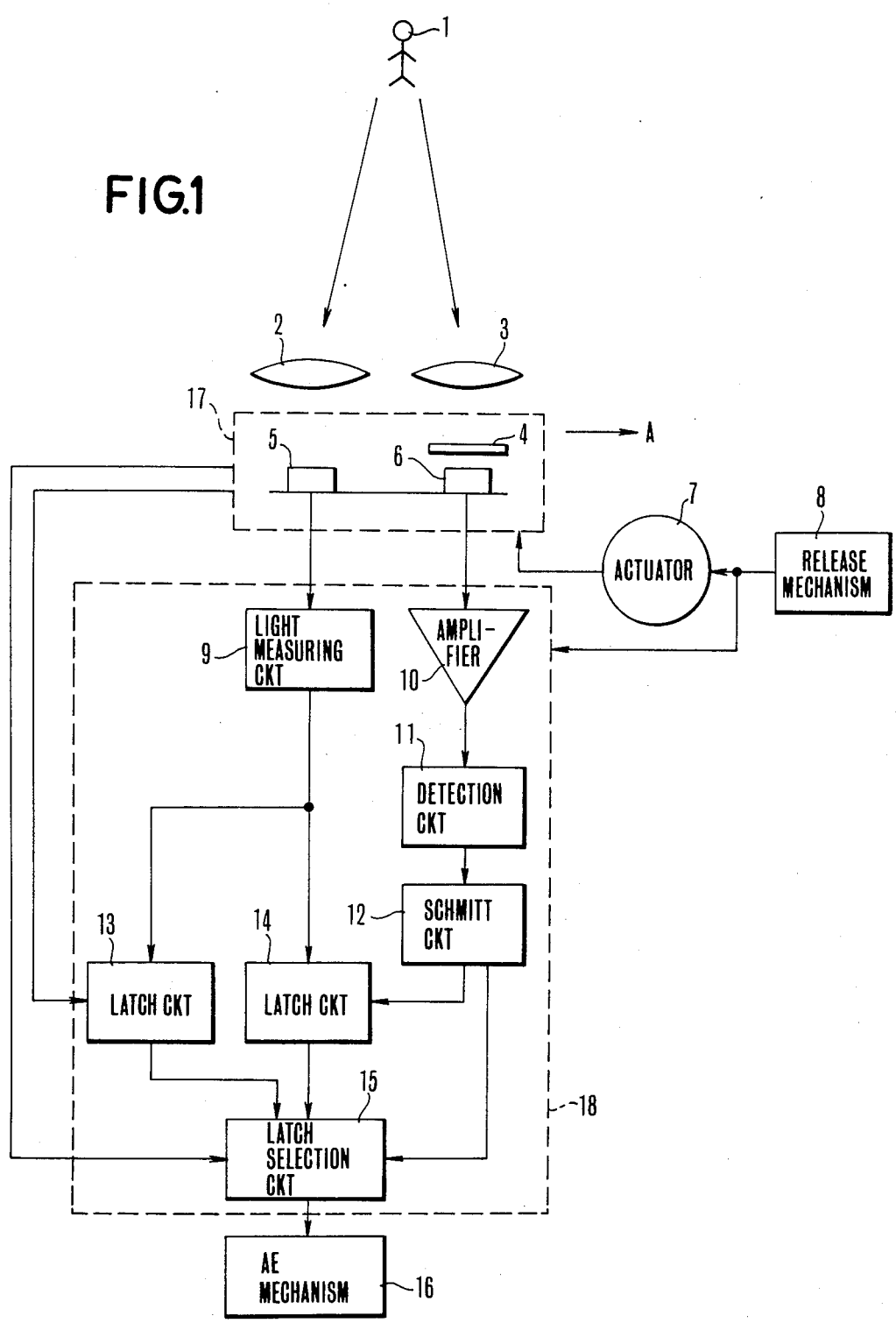
FIG. 1 is a block diagram of the circuitry of an embodiment of a light measuring device according to the invention.

FIG. 1 is a circuit block diagram illustrating one embodiment of the invention. In the drawing, 1 is a person as an object to be photographed. A lens 2 constitutes an optical system for limiting the field of view of a spot light measuring element 5. Another lens 3 constitutes an optical system for limiting the field of view of a pyroelectric type infrared ray sensor 6. A filter 4 for cutting off to wavelengths shorter than the near infrared light to remove the influence of the sun light, etc., is attached to the sensor 6. The light measuring element 5 and the sensor 6 are fixed so as to have almost the same optical axis to each other, and to constitute a sensor porton 17. Responsive to a signal from a release mechanism 8 of the camera, an actuator 7 moves the sensor portion 17 to scan horizontally in a direction indicated by arrow A. A light measuring circuit 9 known to those skilled in the art is connected electrically to the light measuring element 5, and its output is connected both to a latch circuit 13, responsive to a signal representing that the sensor portion 17 has come to the center for holding the measured value of light, and to another latch circuit 14 responsive to a signal occurring when the pyroelectric type sensor 6 had detected infrared rays for holding the measured value of light. An amplifier 10 amplifies the output of the sensor 6. A detecting circuit 11 determines whether or not the object is present from the amplified output of the sensor 6. A Schmitt circuit 12 triggers the latch circuit 14 when the detecting circuit 11 has detected the object. A latch selection circuit 15 is rendered operative when the scanning of the sensor portion 17 terminates, and, in this state, selects the latch circuit 14 when the Schmitt circuit 12 has generated the trigger signal, in other words, when the object was detected by the sensor 6 at a time during the above-described scanning operation, or the latch circuit 13 when the Schmitt circuit 12 has not generated the trigger signal, in other words, when the above-described scanning by the sensor 6 did not detect any object. An automatic exposure (AE) mechanism 16 determines the shutter speed or aperture value of the camera by the light measurement value held in the one of the latch circuits 13 and 14 which has been selected by the selection circuit 15, as is well known in the art. It should be noted that, the above-described light measuring circuit 9, amplifier 10, detecting circuit 11, Schmitt circuit 12, latch circuits 13 and 14 and selection circuit 15 constitute a light measuring mechanism portion 18.

In the above-described selection circuit 15 there is provided a latch circuit portion constructed with an RS flip-flop (not shown) to be set by the trigger signal. By the set output, the latch circuit 14 is selected. Also, the latch circuits 13 and 14 employ, for example, condensers, and analog switches are arranged at the input terminals of the condensers to turn on for a time by the trigger signal and a signal from the sensor portion 17, so that the light measurement outputs are held. The material of the above-described lens 3 maybe ZnSe or like permeable to the far infrared rays.

Next, the operation of this embodiment of the above-described features is described. At first, the photographer operates a release button or the like so that the release mechanism 8 starts to move along with the actuator 7, and at the same time, the light measuring mechanism portion 18 is supplied with electrical power so that the light measuring mecahnism portion 18 starts to operate. The actuator 7 causes the sensor portion 17, with the light measuring element 5 and sensor 6 having almost the same optical axis and fixed thereon, to scan from an initial position to the direction indicated by the arrow A. The sensor portion 17 in the initial position is assumed to measure light at one end portion of the image frame.

In the above-described scanning progress, when the sensor portion 17 detects the object 1, that is, when the sensor portion 17 has moved to the confronting position to the object in which the optical axis of the sensor 6 coincides with the object 1, the level of infrared light from the object 1 sensed by the sensor 6 exceeds a prescribed value. Therefore, the detecting circuit 11 produces an output by which the Schmitt circuit 12 is actuated to produce a trigger signal which is applied to the latch circuit 14.

Meanwhile, the light measuring circuit 9 is performing the light measuring operation during the scanning of the sensor portion 17, and is measuring light of the individual points of the image frame as the above-described scanning goes on. Therefore, when the trigger signal is transmitted to the latch circuit 14 in such a manner as described above, that output of the light measuring circuit 9 which takes place at that time point is held in the latch circuit 14. Thus, the light measurement output of the time when the light measuring element 5 has been moved to the object position by the above-described operation, that is, the measured value of light for the object 1 is held in the latch circuit 14.

In addition to the above, as the scanning of the sensor portion 17 further advances, when it is positioned at the central portion of the photographic image frame, the latch circuit 13 is operated by a signal from the sensor portion 17, and holds the light measurement output of that time point. Thereby, the measured light value of the central portion of the image frame is latched in the latch circuit 13.

As the above-described scanning furthermore advances, when the sensor portion 17 moves to the other side of the image frame, or when the scanning by the sensor portion 17 ends, the latch selection circuit 15 is operated by a signal from the sensor portion 17.

This selection circuit 15 has, as described above, a latch circuit portion to be set by the trigger signal, and selects the latch circuit 13 or 14 depending on whether or not the trigger signal has been produced from the Schmitt circuit 12 during the scanning. In the case when, as has been described above, the trigger signal has been produced during the scanning, since the above-described latch circuit portion is set, the latch circuit 14 is selected in response to this set output, and the measured light value held in the latch circuit 14, that is, the measured light value for the object 1, is transmitted to the AE mechanism 16. Also, at the termination of the scanning by the sensor portion 17, the AE mechanism 16 operates so that the exposure is controlled on the basis of this measured light value.

Also, in the case when the trigger signal has not been produced during the scanning, the above-described latch circuit portion is not set and the latch selection circuit 15 selects the latch circuit 13. The measured light value held in the latch circuit 13 is transmitted to the AE mechanism 16 so that on the basis of this measured light value, that is, measured light value for the center of the photographic image frame, the exposure is controlled.

Though, in the above-described embodiment of FIG. 1, the lenses 2 and 3 are provided, if the sensor portion 17 is arranged in the light measuring position of the known single lens reflex camera, and the light from the object to be photographed is transmitted by a beam splitter or the like to the light measuring element 5 and sensor 6 arranged in the optically transparent position, it is of course possible to apply the present invention to the usual single lens reflex cameras.

Figure 2:
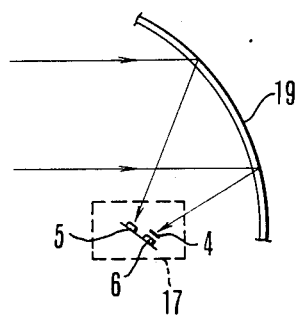
FIG. 2 is a construction diagram illustrating another example of the light measuring optical system of the embodiment of FIG. 1.

FIG. 2 is a construction view illustrating an embodiment in which light from the image plane is transmitted through a reflection mirror 19 to the light measuring element 5 and sensor 6 of the sensor portion 17 arranged near the focus thereof. By constructing in such a way, the spacing between the light measuring element 5 and the sensor 6 can be shortened, and it becomes possible to reduce the size of the sensor portion 17 and simplify the drive system.

Also, though, in the embodiment, the sensor portion 17 is driven, instead of this, the optical system 2, 3, may be moved, or the sensor portion 17 and the optical system 2, 3 may be rotated when the scanning is performed. Also, the above-described reflection mirror 19 of FIG. 2 may be rotated.

Figure 3:
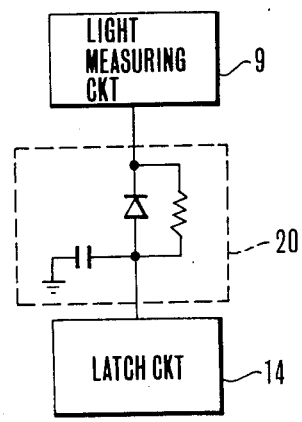
FIG. 3 is an electrical circuit diagram illustrating another example of the light measuring circuit portion of the embodiment of FIG. 1.

FIG. 3 illustrates a modification of the embodiment of FIG. 1 with a time constant circuit 20 inserted between the light measuring circuit 9 and the latch circuit 14. Thereby, when back light or sun light or the like is detected, the light measurement output of these is prevented from being held in the latch circuit 14, and for dark background, the output of the light measuring circuit 9 is properly followed to be transmitted to the latch circuit 14.

Figure 4A:
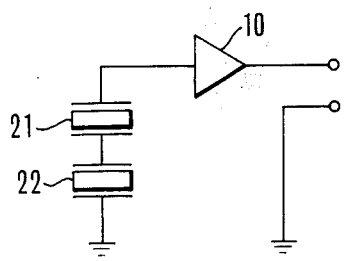
FIG. 4(a) is an electrical circuit diagram illustrating another example of the sensor 6 of the embodiment of FIG. 1.
Figure 4B:
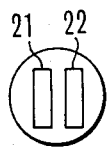
FIG. 4(b) is construction view illustrating the arranging state of the sensor of FIG. 4(a).
Figure 4C:
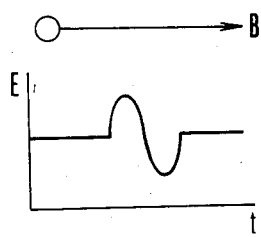
FIG. 4(c) is a waveform considered to explain the operation of the sensor of FIG. 4(a).

FIG. 4(a) illustrates an example of circuit using a differential type sensor as the pyroelectric sensor 6 shown in FIG. 1. As shown in FIG. 4(b), a pyroelectric elements 21 and 22 are arranged, and as shown in FIG. 4(c), a differential-like output being obtained for a heat source moving in a direction B. Therefore, the heat source detection can be performed by the differential output detection.

As has been described above, in the present invention, when a human being as the object has been sensed by scanning the photographic image frame with the use of the pyroelectric type infrared ray sensor, a spot-measured light value from the light measuring element arranged in the same optical axis as that of the above-described sensor is obtained. Therefore, while the object may lie anywhere in the image frame, the light measuring operation for the object can automatically be carried out without moving the camera.

Also, since, if the above-described scanning results in no detection of the object, the light measurement of the central portion of the image frame is carried out, it becomes possible to carry out a light measurement suited for the photographic situation.

What is claimed is:

1. A light measuring device comprising a sensor portion including a light measuring element and a heat source sensor arranged in positions to receive light substantially from a same optical axis; scanning means for scanning a photographic image plane by said sensor portion; and light measuring detecting means for detecting a light measurement output signal of said light measuring element when an object to be photographed is detected by said heat source sensor.

2. A light measuring device according to claim 1, wherein said light measurement detecting means includes a detecting circuit responsive to an output signal of said heat source sensor for producing a control signal when said output signal has reached a prescribed value, and a latch circuit responsive to the signal from said detecting circuit for latching the light measurement output signal of said light measuring element.

3. A light measuring device according to claim 1, further comprising:
    (a) release means connected to said scanning means for triggering the scanning means in response to a release operation of a camera.

4. A light measuring device according to claim 1, wherein said heat source sensor includes a pyroelectric type infrared ray sensor.

5. A light measuring device according to claim 1, wherein said light measuring element produces an output corresponding to the intensity of light from a portion of said photographic image plane.

6. A light measuring device according to claim 1, further comprising a reflection mirror arranged to conduct light from said photographic image plane to said sensor portion, said sensor portion being provided at a position where the light from said photographic image plane is concentrated by said reflection mirror.

7. A light measuring device according to claim 2, further comprising:
    (a) a time constant circuit connected between said light measuring element and said latch circuit.

8. A light measuring device for a camera comprising:
    (a) light measuring means for producing an output signal corresponding to an intensity of incident light from an object to be photographed;
    (b) heat ray sensitive means for producing an output signal corresponding to the heat rays from the object;
    (c) means for causing the optical axes of said light measuring means and said sensitive means to coincide with each other;
    (d) scanning means arranged so that said light measuring means and said sensitive means scans successively from one side of the photographic image plane to an opposite side thereof;
    (e) latch means responsive to the output signal from said sensitive means for latching the output signal from said light measuring means when said sensitive means has outputted a signal representing that said object has been detected; and
    (f) means for controlling an exposure value in response to the output of said latch means.

9. A light measuring device according to claim 8, wherein said light measuring element produces an output corresponding to the intensity of incident light from a portion of said photographic image plane.

10. A light measuring device according to claim 8, wherein said sensitive means includes a pyroelectric type infrared ray sensor.

* * * * *